Sept. 8, 1970      D. D. HAMILTON      3,527,272
MODIFIED FELLING HEAD
Filed March 11, 1968      6 Sheets-Sheet 6
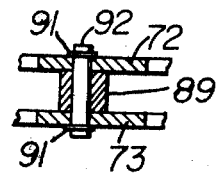
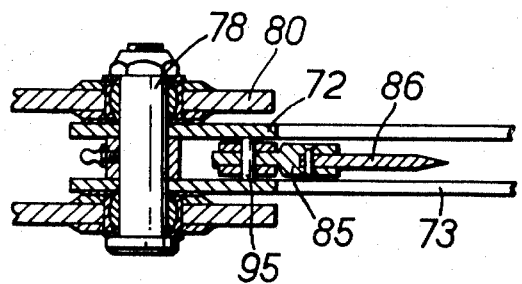
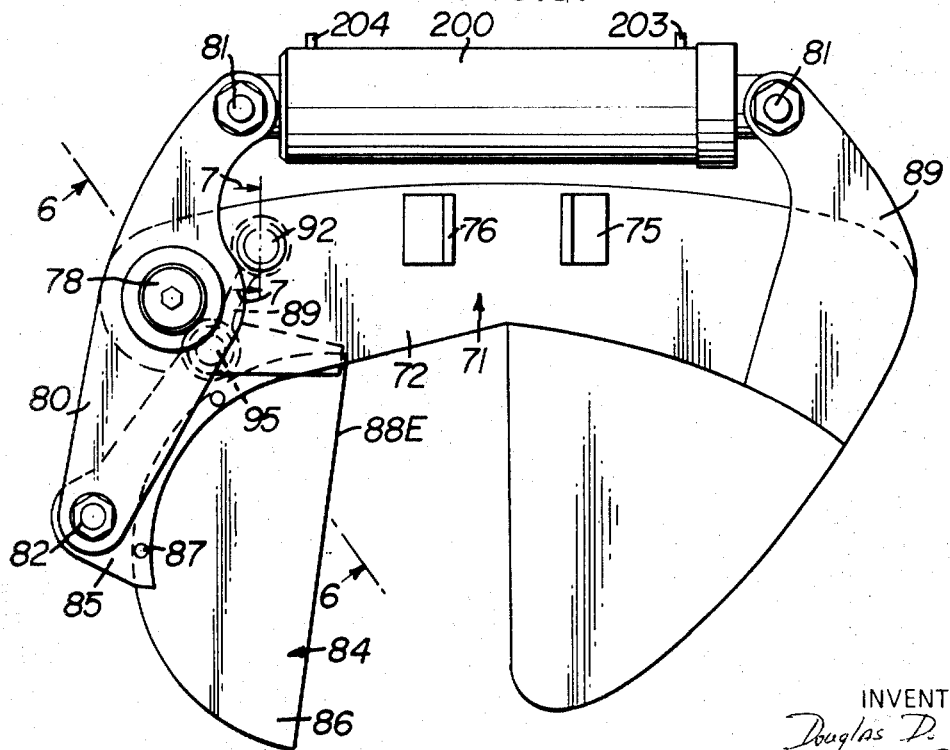
INVENTOR
Douglas D. Hamilton
BY Jacobi & Davidson
ATTORNEY United States Patent Office 3,527,272
Patented Sept. 8, 1970

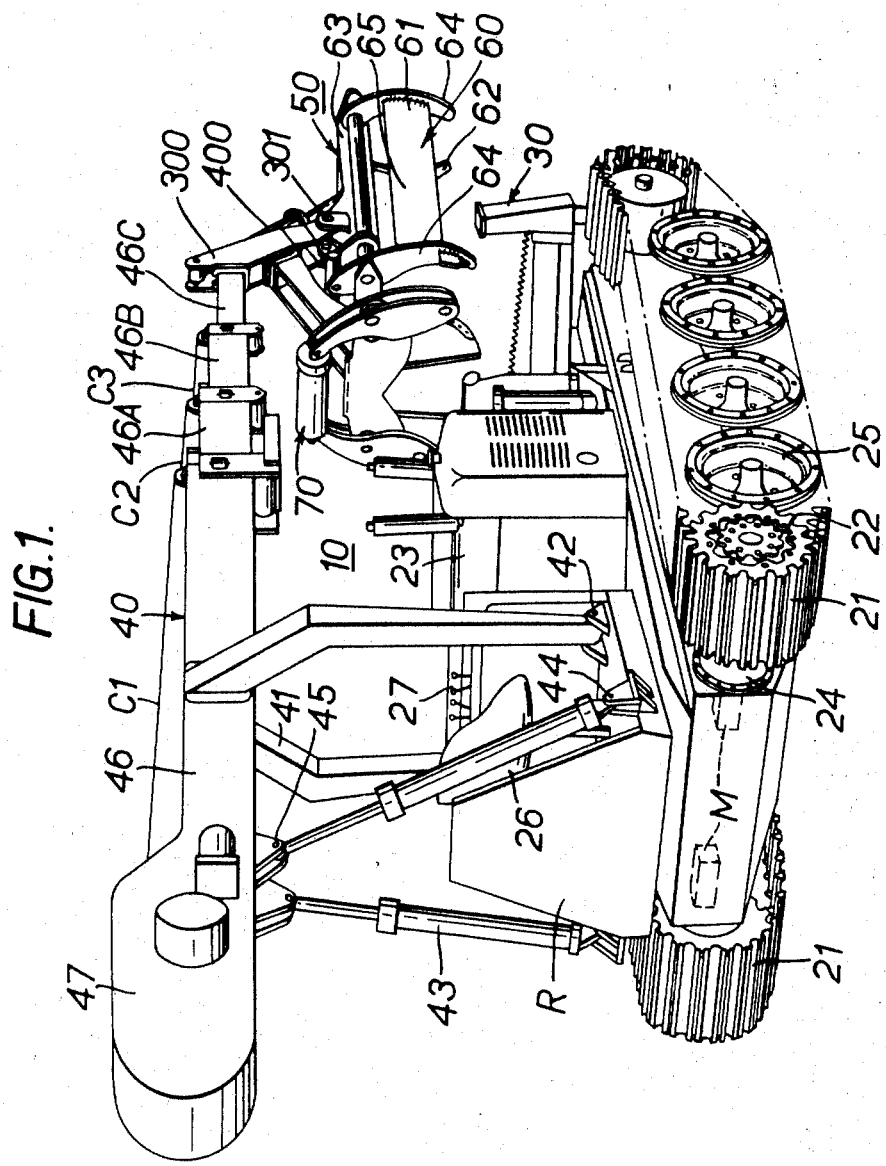

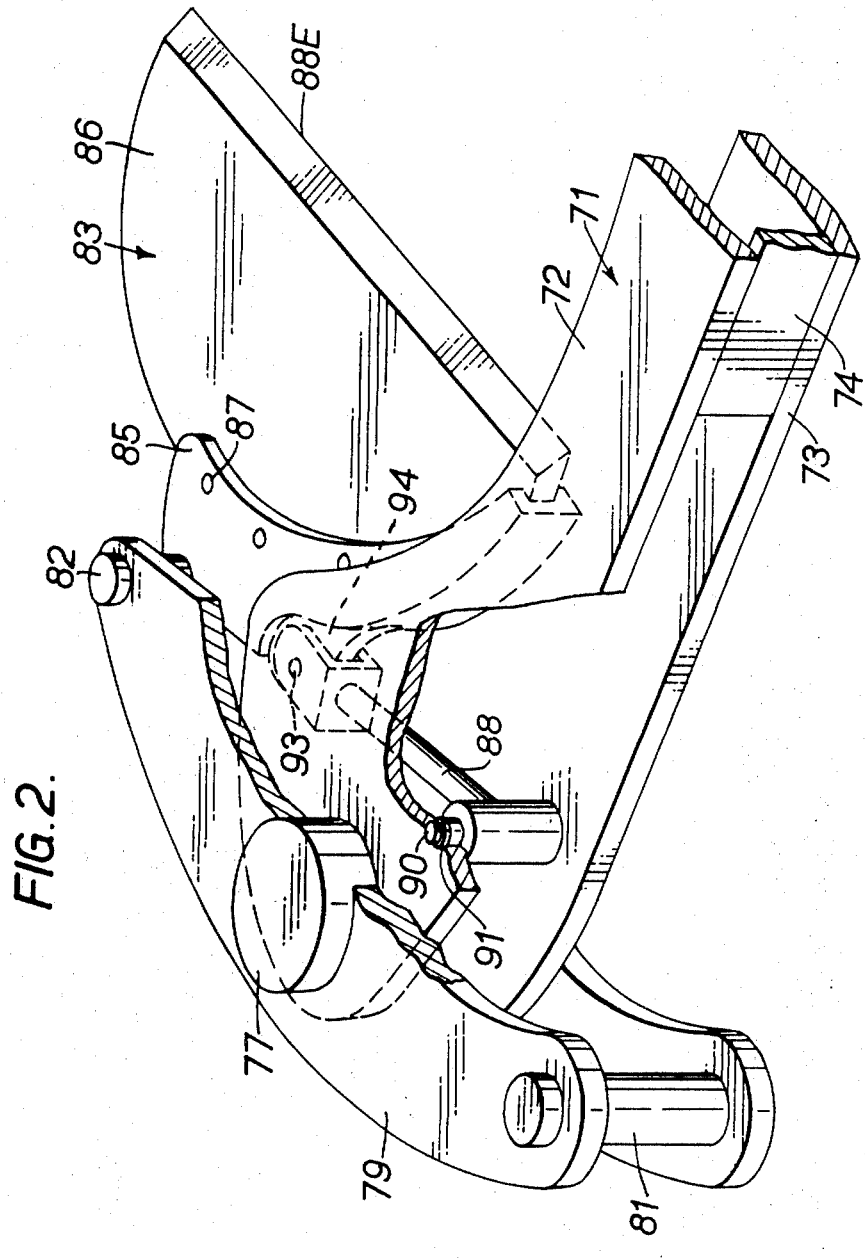

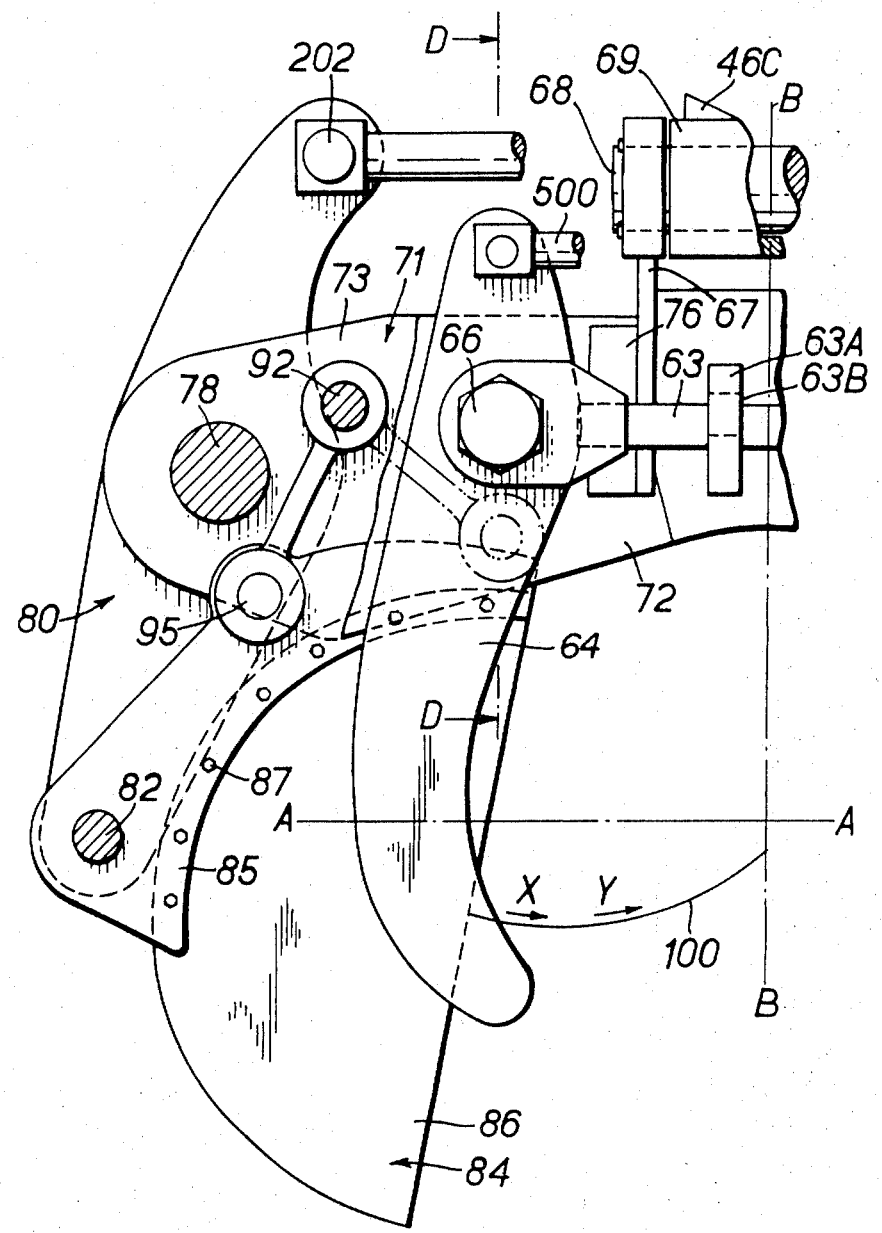

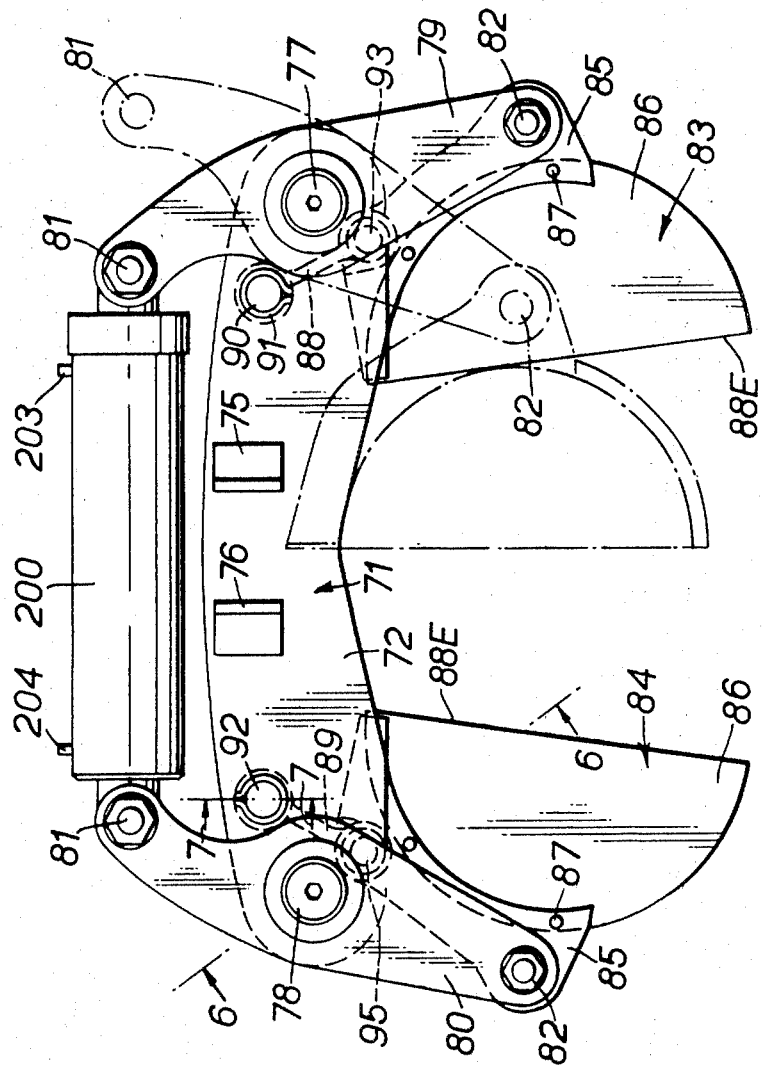

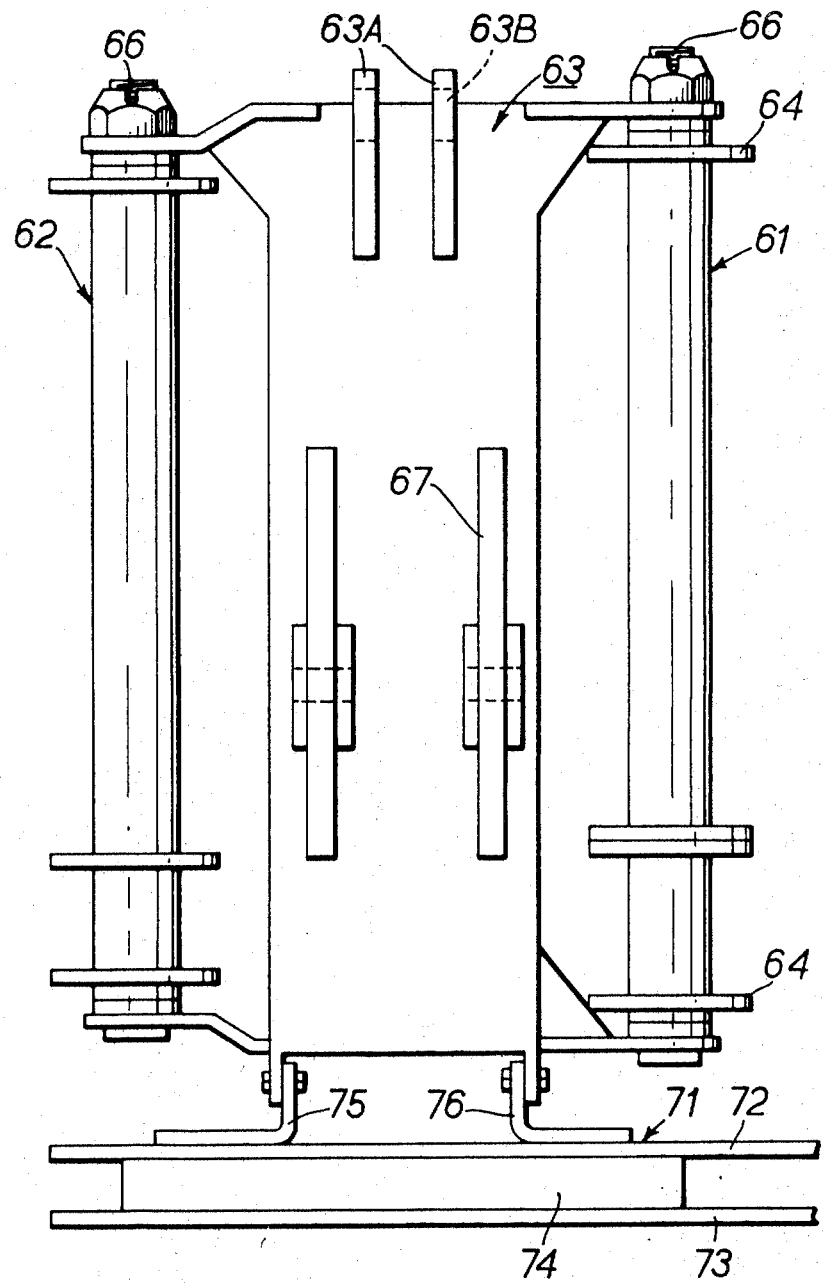

3,527,272
MODIFIED FELLING HEAD
Douglas D. Hamilton, Mount Royal, Quebec, Canada, assignor of one-third each to Canadian International Paper Company and Quebec North Shore Paper Company, both of Montreal, Quebec, Canada, and Anne Paper Ltd., Beaupre, Quebec, Canada, all corporations of Canada
Filed Mar. 11, 1968, Ser. No. 712,053
Claims priority, application Canada, Mar. 14, 1967, 985,180
Int. Cl. A01g *23/02*
U.S. Cl. 144—3          33 Claims

ABSTRACT OF THE DISCLOSURE

A tree felling vehicle having a felling head attached to the free end of an extendible and retractable boom wherein the felling head consists of a grapple for engaging a tree to be felled and a shear mechanism having a pair of cutting members selectively movable with respect to one another along a particular path for severing the tree engaged by the grapple. The shear blades move in an arcuate path whereby the cutting edge has a component of motion parallel to such edge which reverses during the cutting operation.

---

This invention relates to improvements in a shear for severing articles, to the combination of such improved shear and a grapple which combination will be referred to as a felling head and to the combination of a self-propelled mobile vehicle having an improved felling head mounted thereon for felling trees and skidding the felled trees to a selected area.

There is disclosed in U.S. Pat. No. 3,270,787 issued Sept. 6, 1966 a shear for severing trees which consists of a shear blade attached to a frame by a pair of links. The present application is directed to improvements in a shear of such type, to the combination of the improved shear and a grapple and to the combination of an improved felling head and skidder.

It is an object of the present invention to provide an improved means of mounting a cutting member on a frame such that the cutting edge of the cutting member travels in a particular path. The path is arcuate and arranged such that the cutting edge has a component of motion parallel to such edge which component reverses in direction during severing an article.

Accordingly, in one aspect of the present invention, there is provided in the art of shearing an article by a shear mechanism having a frame and at least one cutting member mounted mounted thereon with means for effecting reciprocal movement of the cutting member relative to the frame and wherein such cutting member has a cutting edge angularly disposed with respect to the reciprocal movement, the improvement which comprises: reversing the movement of the cutting edge in a direction angularly disposed with respect to the direction of reciprocal movement and simultaneously therewith.

In a further aspect of the present invention, there is provided a shear mechanism which has a frame and at least one cutting member mounted thereon for movement in a direction toward and away from an abutment to effect severing of an article disposed between the cutting member and the abutment, the improvent comprising a pair of links each pivotally connected to a selected portion of the cutting member and said frame and arranged such that the cutting edge of the cutting member has a component of motion parallel to such edge and wherein such component reverses at least once during severing of an article.

A further object is to provide a tree severing mechanism wherein the cutting members are movable to an open position with minimum travel of the actuating mechanism. This is accomplished by virtue on an inherent feature of having the pivots for the pair of links connecting the cutting member to the frame arranged such that there results the aforementioned reversal in movement of the cutting edge. Effectively the cutting member moves at an increasing rate from a closed to an open position.

Accordingly, there is provided in a still further aspect of the present invention a shear mechanism which has a frame end at least one cutting member mounted thereon for movement in a direction toward and away from an abutment to effect severing of an article disposed between the cutting member and the abutment, the improvement comprising a pair of links each pivotally connected to a selected portion of the cutting member and said frame, the pivotal connections of the links being so arranged that the cutting member moves at an increasing rate from an open to a closed position.

In accordance with a still further aspect of the present invention, there is provided a shear mechanism comprising in combination: (a) a frame; (b) a pair of lever arms each pivotally connected to said frame at positions in spaced relationship with respect to one another; (c) a pair of cutting members each pivotally connected to respective ones of the lever arms; (d) a pair of link members each pivotally connected to said frame and respective ones of said cutting members, the pivotal connection of the link members to the frame being disposed in fixed spaced relation with respect to one another; and (e) means to move said lever arms or links and thereby effect movement of said cutting members in a direction generally toward and away from one another respectively to sever and receive an article therebetween.

The invention is illustrated by way of example in the accompanying drawings wherein:

FIG. 1 is a oblique diagrammatic illustration of a machine having a felling head mounted thereon and also a bunk assembly, such machine being generally referred to as a feller-skidder vehicle;

FIG. 2 is a partial sectional oblique diagrammatic illustration of the right-hand portion of a shear mechanism constructed in accordance with the present invention;

FIG. 3 is a partial sectional top plan view of the left-hand portion of the felling head constructed in accordance with he present invenion;

FIG. 4 is a top plan view of a shear mechanism constructed in accordance with the present invention;

FIG. 5 is a rear elevational view of the frame portion of the felling head;

FIG. 6 is a sectional view taken substantially along section 6—6 of FIG. 4;

FIG. 7 is a partial sectional view taken along lines 7—7 of FIG. 4; and

FIG. 8 is a top plan view similar to FIG. 4 illustrating the modified embodiment.

Referring now in detail to the drawings, shown in FIG. 1 is a self-propelled tree felling and skidding machine 10. The machine consists of a crawler-type tractor unit 20 having a bunk 30 and an extendible and retractable boom 40, each pivotally mounted thereon. The boom illustrated is telescopic but this need not be so as a knuckle boom or the like may be used. Fixed to the free end of the boom is a felling head assembly 50 consisting of a grapple mechanism 60 and a shear mechanism 70. The shear mecahnism may be rigidly or detachably secured to the grapple and the grapple and shear are preferably each independently operable by suitable mechanism as for example hydraulic actuators.

The crawler tractor 20 is substantially the same as that illustrated in U.S. Pat. No. 3,227,295 and consists of a pair of tracks 21, each driven by a sprocket member 22 connected to a power source 23 through a suitable drive mechanism. The power source 23 preferably consists of an internal combustion engine and the drive for the sprockets may consist of hydraulic motors supplied with fluid by pumps which are driven by the internal combustion engine. A pair of hydraulics M are illustrated in phantom and the motors may individually be connected to the respective adjacent sprockets 22 through reduction transmission units 24. Control of the motors may be independent through appropriate valve mechanisms in the fluid supply and thereby provide means for steering the vehicle. The hydraulic motor with individual control for each track permits driving each track forward or reverse independent of the other track and this makes the vehicle extremely manoeuverable. The hydraulic motors M are relatively high speed motors and the reduction transmission units 24 are designed so as to provide a suitable speed range for the vehicle. This speed range may be preferably in the vicinity of 0–15 m.p.h.

The tracks 21 consist of flexible members which interconnect rigid shoes having guide horns on the inner face to form a track for a series of independently mounted vehicle support wheels 25. The wheels need not be independently mounted but preferably independent spring-mounting of each wheel adapts the vehicle for use in relatively rugged terrain.

The vehicle may be controlled by an operator positioned in a seat 26 mounted on a platform located adjacent one end of the vehicle. Valves for controlling hydraulic circuitry for the machine and for effecting operation of the various components are located on the dashboard 27.

The boom assembly 40 is pivotally mounted on a frame R by means of downwardly directed arms 41 and pivot pins 42. The frame R is pivotally mounted on the vehicle frame so as to permit slewing about a vertical axis. Pivotal movement of the boom 40 about the pivot pins 42 is effected by a pair of hydraulic cylinders 43, each pivotally connected at the cylinder end by a pin 44 to the platform or frame R and at their piston rod end to the rearward end of the boom by a pin 45. Again, control of the boom through the hydraulic cylinders 43 is provided by suitable valves located in the operator position. Pivotal movement of the boom about the pins 42 effects raising and lowering of the free end of the boom and thereby provides means whereby the felling head may be positioned adjacent trees located in the vicinity of the vehicle. The boom 40 consists of a rigid outer box section 46 having a grapple and winch drum assembly 47 located adjacent one end thereof. The winch drum may be suitably driven by a hydraulic motor and arranged to effect extension and retraction of the boom's movable sections 46a, 46b, and 46c. If desired, a knuckle boom may be substituted for the telescopic boom illustrated in FIG. 1.

The winch and grapple assembly 47 is not discussed in further detail as the complete assembly and operation of the same is described in the aforementioned U.S. Pat. No. 3,227,295.

Referring now to FIGS. 2–8 inclusive, the shear mechanism 70 consists of a rigid frame 71 consisting of a pair of plate members 72 and 73 held in spaced relation and interconnected by a bar member 74. The plate members 72 may be mounted to a downwardly extended portion of the grapple frame or bolted thereto as illustrated in FIG. 5. Each of the plate members 72 and 73 is apertured at opposed ends to receive respective pivot pins 77 and 78. Each of the pivot pins 77 and 78 project through the plate members to provide a pivotal mounting for a pair of actuator lever arms 79 and 80. The pins 77 and 78 may be pivoted in the plate members and the actuator lever arms may be rigidly secured to the pin or alternatively the pins 77 and 78 may be rigidly secured to the plate members 72 and 73 to hold the same in selected spaced relation, in which event, the respective actuator lever arms 79 and 80 may be pivotally mounted on the pins 77 and 78.

Each actuator lever 79 and 80 consists of a pair of plates disposed respectively on opposite sides of the frame 71. The pair of plates of each actuator lever arm are interconnected at one end by a pivot pin 81 and at the opposite end by a pivot pin 82.

The shear mechanism further includes a pair of cutting members 83 and 84 mounted on the frame 71 so as to be relatively movable in a direction towards and away from one another along a selected path. Each cutting member consists of a knife holder 85 and a knife 86 detachably secured thereto by a series of studs or the like 87. The knife 86 terminates at one edge in a substantially straight sharpened cutting edge 88. The knife holders 85 of the respective cutting members 83 and 84 are pivotally secured to respective ones of the actuator levers 79 and 80 by the pivot pin 82. The knife holder is a substantially arcuately shaped member having a portion disposed between the adjacent faces of the plate members 72 and 73. If desired, such portion of the knife holder may be in sliding engagement with the plate members to provide a guide for the knife members during reciprocation of the same along a selected path.

As mentioned, the cutting members are pivotally connected to respective ones of the actuator lever arms 79 and 80 which, in turn, are pivotally connected to the frame 71. The respective cutting members 83 and 84 are further pivotally connected to the frame 71 by a pair of link members 88 and 89. Each of the link members 88 and 89 is pivotally secured at one end to the frame 71 and the opposite end of the link members 88 and 89 is pivotally secured to respective ones of the cutting members 83 and 84. The link member 88 is secured to the frame 71 by a pivot pin 90 which extends through an aperture in the link member in alignment with apertures in respective ones of the frame plate members 72 and 73. The pin 90 may be retained in position by a C-clip adjacent each end of the pin and which fits into a groove in the pin. Similarly, the link 89 is pivotally connected to the frame by a pivot pin 92. The opposite end of the link member 88 is pivotally connected to the knife holder by a pin 93 located at a position intermediate the pivot pin 82 and pivot pin 90. The link, as illustrated in FIG. 2, terminates in a U-shaped portion with the legs thereof being disposed respectively on opposite sides of a lug portion 94 on the knife holder provided by a recess or relieved portion. Similarly, the link 89 is connected to the knife holder of the cutting member 84 by a pivot pin 95.

FIG. 2 illustrates the righthand portion only of the sheer mechanism whereas FIG. 3 illustrates the lefthand portion only of the shear mechanism in combination with the grapple.

As will be seen in FIGS. 3 and 4, the arrangement of the actuator lever arm 80, the cutting member 84, the frame 71 and pivot pins 78, 82, 92 and 95 is such that, in effect, a parallelogram arrangement is provided. The pivot pins 82, 95 and 92 are substantially in alignment with the pivot pin 78 offset at a position intermediate the pivot pins 92 and 95 when the cutting member 84 is in its extreme open position. Obviously, the pivot pins may be variously arranged but with the arrangement as illustrated in FIG. 3 provide a particular path of travel of the knife during severing an article. Reciprocation of the cutting member 84 generally in the direction of the line A—A (see FIG. 3) causes an arcuate movement of the cutting edge. The path of movement of the cutting edge during opening and closing of the cutting member is traced by the dotted line 100 and this line, in reference to line A—A and line B—B at right angles thereto, is such that the cutting edge throughout a portion of its travel moves in a direction away from the line A—A and subsequently through a further portion in a direction towards the line A—A. This movement away from the line A—A is generally represented by the arrow X in FIG. 3 and the movement toward the line A—A is generally indicated by the arrow Y. It is thus evident that FIG. 3 that the cutting edge reverses its direction of travel in a direction transverse to the reciprocating movement of the knife simultaneously with such reciprocating movement. It is obvious that the space between the pair of cutting members 84 and 83 may be such that this reversal of movement of the cutting edge occurs during severing of an article, of selected size, by the cutting members. The amount of reversal furthermore may be modified by variously positioning the pivot pins 78, 82, 92 and 95 relative to one another.

In order to effect movement of the cutting members, a hydraulic cylinder assembly 200 is pivotally interconnected at opposed ends respectively by the pair of pivot pins 81 to the respective actuator arms 79 and 80. Control of fluid to the appropriate side of the piston in the cylinder may be by valves controlling the flow of fluid through conduits connected to the hydraulic cylinder at opposed ends respectively by conduit or couple members 203 and 204. The control of the fluid to the cylinder may be effected by appropriate manipulation of lever valves located at the vehicle operation station and dashboard 27.

During reciprocation of the cutting members 83 and 84 toward and away from one another, a portion of the respective knife holders remains at a position between the plate members 72 and 73 of the frame. The portion of the knife holder which remains between the plate members contains the respective pivot pins 93 and 95 which connect the respective link members thereto. The pivot pins 93 and 95 accordingly may be loose-fitting pins having a length substantially equal to the space between the plate members 72 and 73 and thereby, in an assembled unit, held captive by the plate members.

In the described arrangement of the levers and links connecting the cutting members to the frame, each cutting member moves through an arcuate path. The path as noted has components of motion indicated respectively by arrows X and Y that move in a direction away from and toward the plane A—A. (It will be noted the plane A—A is parallel to the length of the frame and parallel to planes which pass through respective pivot pins 90 and 92 and 77 and 78.) By this arrangement, the cutting members move at a varying rate during each of opening and closing respectively to receive and sever an article. During at least the latter portion of movement from a closed (i.e. article severed position) to an open position, the rate of movement increases. Accordingly the jaw opens relatively wide to receive a tree with minimum retraction of the length of the hydraulic cylinder assembly 200 which interconnects the lever arms 79 and 80. The rate of movement of the cutting member decreases as it approaches a closed position. In using a pair of cutting members as illustrated, this latter rate of movement accordingly results in maximum mechanical advantage at the closed position, which when severing a tree has the cutting edges of the cutting members at the maximum diameter of the tree.

The grapple mechanism 60 consists of jaw members 61 and 62 each pivotally mounted on a rigid frame 63. Each jaw member 61 and 62 includes a pair of spaced arcuate members 64 interconnected by a plate 65. Each jaw member 61 and 62 is pivotally mounted on the frame by respective ones of a pair of pivot pins 66. The rigid frame portion 63 includes a pair of rearwardly directed plates 67 apertured to receive a pin 68 (see FIG. 3) and thereby pivotally mount the felling head assembly on the free end portion 69 of an extendible and retractable boom member 46c. The mounting illustrated in FIG. 3 is an alternative to the arrangement illustrated in FIG. 1 where the grapple is pivotally connected to a mounting member 300 by a pin 301. The mounting member 300 may be rigidly or detachably secured to the extendible and retractable boom section 46c. The frame member 63 further includes a pair of upstanding lugs 63a (see FIG. 5) apertured as at 63b to receive a pin and thereby pivotally connect one end of a hydraulic tilt cylinder 400 to the felling head mechanism. The opposite end of the tilt cylinder 400 may be appropriately pivotally connected to the boom extendible section 46c and appropriate control of fluid to and from the cylinder 400 provides tilting of the felling head relative to the boom. The jaws of the grapple may be opened and close selectively independent of the shear members by a further hydraulic cylinder assembly 500 pivotally connected to a portion of respective ones of the jaws extending rearwardly behind the frame 71.

In operation, the vehicle may be manoeuvered to the vicinity of standing trees by an opeator and thereafter by appropirate controls of the valves extend the felling head to a tree selected for felling. The felling head is tilted to an appropriate vertical position through the influence of the hydraulic cylinder 400 and control of fluid thereto and the boom is then extended to place the grapple jaws and shear in an embracing relation with respect to the selected standing tree. The jaws of the grapple thereafter are brought into engagement with the tree and the cutting members 83 and 84 move in a direction towards one another and thereby sever the standing tree. During the cutting operation the grapple serves as an abutment for the tree restraining it from movement while the cutting members are forced through the tree. During the latter part of the movement of the cutting members to a close position (i.e. component Y) the shear frame 71 may serve as an abutment to engage the tree and thus restrain it from movement. The severed tree, which is clasped by the jaws of the grapple, is then manoeuversed by the operator into a position with the butt end placed on the bunk 30 of the vehicle. The butt end of a load of trees may be anchored to the bunk in a suitable manner whereafter the trees are then skidded to a selected location. From the foregoing, it will be seen that the shear mechanism is such that the cutting edge of the knife reverses in direction during severing the tree and, in effect, a sawing action is provided. It is also seen that there is a positive connection between the respective cutter members of the frame, such positive connection being provided by the respective links 88 and 89.

Although the shear disclosed and described includes a pair of relatively movable cutting members, it is obvious that there need be but only one cutting member movable in a direction toward and away from a suitable abutment member. In other words, the abutment is utilized to replace one of the previously described movable cutting members. In FIG. 8 cutting member 83 is replaced by an extension of the frame which provides an abutment for a tree during severing thereof. The lever 79 in such embodiment is rigidly secured to the frame 71 providing an anchor for the hydraulic cylinder assembly.

The bunk mechanism 30 may be of the general type illustrated in copending Canadian application No. 898,252 filed Mar. 19, 1964. Disclosed in that application is a plurality of arcuate arms pivotally connected to a generally U-shaped frame member. It will also be seen in that application that pairs of the arcuate arms are interconnected by hydraulic cylinders thereby interrelating the motion of the arms. The arcuate arms may be arranged in such a manner as to be in facing relation with respect to one another with further arms facing suitable abutments and the overall arrangement being such that pivotal movement of the arcuate arms engages the butt end of trees mounted on the bunk. This type of bunk alleviates the need for the normal choker or other external fastening means and accordingly, all operations of the skidder vehicle may be performed by the operator without the operator having to move from the central control station.

I claim:

1. In a shear mechanism having a frame and a cutting member mounted thereon with means for effecting reciprocal movement of the cutting member relative to an abutment mounted on such frame and wherein such cutting member has a cutting edge angularly disposed with respect to such reciprocal movement, the improvement comprising: a lever member and a link member interconnecting said cutting member and said frame, effecting reverse movement of the cutting edge in a direction angularly disposed with respect to the direction of reciprocal movement, during severing an article disposed between the cutting member and the abutment, and simultaneously with such reciprocal movement.

2. The improvement as defined in claim 1 wherein said cutting member travels in an arcuate path.

3. The improvement as defined in claim 1 wherein there is only one reversal of direction during severing of an article.

4. A shear as defined in claim 1 wherein said frame includes a channel-like portion receiving a portion of the cutter member to provide a guide therefor during reciprocal movement thereof.

5. A shear mechanism as defined in claim 1 wherein said frame includes a pair of plate-like members disposed in selected spaced relationship with respect to one another to provide an elongated channel, said cutting member having a portion slidably movable in said channel during reciprocal movement thereof and thereby providing a guide for said cutting member.

6. A shear mechanism as defined in claim 5 wherein said cutting member includes a shear blade having a substantially straight cutting edge.

7. A device as defined in claim 1 wherein said cutting member comprises a knife having a substantially straight cutting edge.

8. A device as defined in claim 1 wherein said cutting member comprises a knife holder and a knife member detachably secured thereto.

9. A felling head as defined in claim 1 wherein said cutting member comprises a shear blade having a substantially straight cutting edge.

10. In a shear mechanism having a frame and a cutting member mounted thereon for movement in a direction toward and away from an abutment, mounted on said frame, to effect severing of an article disposed between the cutting member and the abutment, the improvement comprising: a lever member and a link member interconnecting said frame and said cutting member, each of said lever and link members being pivotally connected to the cutting member and said frame and having the pivotal connections of such members to said frame fixed in position relative to one another and said frame, said lever and link members and the pivotal connections to the cutting member and frame being so arranged that any point on the cutting edge carries out a movement, which has a first component in the longitudinal direction of the cutting edge of said blade and subsequently a second component in the opposite direction during severing of the article.

11. A shear as defined in claim 10 wherein said frame includes a channel-like portion receiving a portion of the cutter member to provide a guide therefor during reciprocal movement thereof.

12. A shear mechanism comprising in combination:
(a) a frame;
(b) a pair of lever arms each pivotally connected to said frame at positions in spaced relationship with respect to one another;
(c) a pair of cutting members each pivotally connected to respective ones of the lever arms and having a cutting edge, the cutting edge of one cutting member facing the cutting edge of the other;
(d) a pair of link members each pivotally connected to said frame and respective ones of said cutting members, the pivotal connection of the link members to the frame being disposed in fixed spaced relation with respect to one another; and
(e) means to move said lever arms or links and thereby effect movement of said cutting members in a direction generally toward and away from one another respectively to sever and receive an article therebetween.

13. A shear as defined in claim 12 wherein said frame includes a channel-like portion receiving a portion of the cutter members to provide a guide therefor during reciprocal movement thereof.

14. A shear mechanism as defined in claim 12 wherein said frame includes a pair of plate-like members disposed in selected spaced relationship with respect to one another to provide an elongated channel, said cutting members each having a portion slidably movable in said channel during reciprocal movement thereof and thereby providing a guide for said cutting members.

15. A shear mechanism as defined in claim 12 wherein said frame includes an elongated channel, partially embracing a portion of each of said cutting members and wherein the pivotal connection of the links with respective ones of the cutting members is disposed within said channel.

16. A shear mechanism as defined in claim 12 wherein each of said cutting members includes a shear blade having a substantially straight cutting edge.

17. A felling head comprising in combination a shear for severing trees comprising:
(a) a frame;
(b) a cutting member;
(c) link means interconnecting said cutting member and said frame comprising lever arm and a link member pivotally connected each at opposed ends respectively to the frame and the cutting member and arranged such as to effect reverse movement of the cutting edge in a direction angularly disposed with respect to the direction of reciprocal movement on said frame during severing of an article;
(d) an abutment secured to said frame and arranged such as to provide an anvil for an article severed by said movable cutting member; and
(e) a grapple secured to said frame, said grapple having a jaw which may be selectively opened and closed respectively to receive and grasp an article therebetween to be severed by said shear mechanism.

18. A felling head comprising in combination a shear mechanism comprising in combination:
(a) a frame;
(b) a pair of lever arms each pivotally connected to said frame at positions in spaced relationship with respect to one another;
(c) a pair of cutting members each pivotally connected to respective ones of the lever arms;
(d) a pair of link members each pivotally connected to said frame and respective ones of said cutting members, the pivotal connection of the link members to the frame being disposed in fixed spaced relation with respect to one another;
(e) means to move said lever arms or links and thereby effect movement of said cutting members in a direction generally toward and away from one another respectively to sever and receive an article therebetween; and
(f) a grapple secured to said frame and having a jaw correspondingly oriented with that of the shear mechanism and which may be opened and closed respectively to receive and grasp an article to be severed by said shear.

19. A feeling head comprising in combination: a grapple consisting of a pair of relatively movable jaw members mounted on a frame and a shear mechanism secured to the latter, said shear comprising:
(a) a frame;
(b) a pair of lever arms each pivotally connected to said frame in selected spaced relationship with respect to one another;
(c) a pair of cutting members located one on each of opposite sides of a selected plane and pivotally connected to respective ones of said lever arms, each af said cutting members having a cutting edge facing the cutting edge of the other cutting member;
(d) a pair of link members pivotally connected to said frame and respective ones of said cutting members, the pivotal connection of the links to the frame being in fixed spaced relationship with respect to one another; and
(e) means to move said lever arms or links and thereby effect movement of said cutting members in a direction generally toward and away from one another to sever an article disposed therebetween, said grapple jaw members and cutting members each being relatively movable with respect to a common plane disposed between said members.

20. A felling head comprising in combination: a grapple and a shear, said grapple including:
(a) a rigid frame having a downwardly projecting portion;
(b) a pair of jaw members, each pivotally secured to said frame;
(c) mounting means on said frame for pivotally connecting the same to an extendible and retractable boom; and
(d) means on said frame to connect thereto an actuator for pivoting said frame relative to the boom when mounted thereon,
said shear being secured to the downwardly projecting portion of the grapple rigid frame and including:
(a) a frame;
(b) a pair of lever arms, each pivotally connected to said frame in selected spaced relationship with respect to one another;
(c) a pair of cutting members pivotally connected to respective ones of the lever arms;
(d) a pair of link members, each pivotally connected to said frame and respective ones of said cutting members, the pivotal connection of the link members to the frame being in spaced, fixed relation with respect to one another; and
(e) means to move said lever arms or links and thereby effect movement of said cutting members in a direction generally toward and away from one another to sever an article disposed therebetween.

21. A felling and tree skidding vehicle comprising in combination:
(a) a mobile tractor unit;
(b) a tree receiving bunk mounted on said tractor unit;
(c) an extendible and retractable boom mounted on said tractor unit and having a free outer end;
(d) a felling head pivotally secured to said boom adjacent the free outer end thereof, the axis of said pivot being substantially horizontal, said felling head including a grapple having a pair of jaws secured to a frame and pivotable about a vertical axis and a shear secured to said frame and having a cutting member movable in an arcuate path toward and away from an abutment on said frame, said cutting member having a first component of motion in one direction during severing an article disposed between said cutting member and said abutment and subsequently a component of motion in the opposite direction during continuation of the severing of said article.

22. A felling and skidding vehicle as defined in claim 21 wherein said bunk includes means anchoring at least one layer of trees thereon and thereby provides, in effect, a platform to receive further trees placed thereon.

23. An apparatus for cutting trees, logs and similar articles comprising a cutting member having a blade and controlled by power means characterized in that a lever and a link member connects said cutting member to said frame, and the means pivotally connecting each of said lever and link to said cutting member and said frame are so arranged that any point on the cutting edge of the blade carries out a movement, which has a first component in the longitudinal direction of the cutting edge of said blade and subsequently a second component in the opposite direction during severing of the article.

24. The improvement as defined in claim 23 wherein said cutting member travels in an arcuate path.

25. A shear as defined in claim 23 wherein said frame includes a channel-like portion receiving a portion of the cutter member and thereby providing a guide for the cutting member during reciprocal movement thereof.

26. Apparatus for cutting trees, logs and the like comprising a frame; a cutting member movable relative to said frame, said cutting member including a blade having a cutting edge, power means mounted on said frame and connected to said cutting member; a lever and a link member interconnecting said frame and said cutting member, each of said lever and link being pivotally connected to said cutting member and to said frame and being so dimensioned and the pivotal connections thereof to the cutting member and frame so located that, upon actuation of said power means during a cutting operation, any point on the cutting edge of said cutting member will carry out a movement which has a first component in the longitudinal direction of said cutting edge and subsequently a second component in the opposite direction to that of the first component.

27. Apparatus as defined in claim 26 wherein said cutting member travels in an arcuate path.

28. A felling head comprising in combination a grapple including a frame and a pair of jaw members movably secured to said frame, said jaw members being relatively movable with respect to one another to embrace and release an article therebetween and a shear mechanism secured to the frame of said grapple, said shear comprising a frame; a cutting member movable relative thereto and having a cutting edge, power means mounted on said frame and connected to said cutting member; a lever member and a link member interconnecting said frame and said cutting member, each of said lever and link members being pivotally connected to said cutting member and to said frame and so dimensioned and the pivotal connections thereof to the cutting member and frame so located that, upon actuation of said power means during a cutting operation, any point on the cutting edge of said cutting member will carry out a movement which has a first component in the longitudinal direction of said cutting edge and subsequently a second component in the opposite direction to that of the first component.

29. A shear mechanism comprising in combination:
(a) a frame;
(b) a pair of lever arms each pivotally connected to said frame at positions in spaced relationship with respect to one another;
(c) a pair of cutting members pivotally connected to respective ones of the lever arms and located one on each of opposite sides of a selected plane;
(d) a pair of link members each pivotally connected to said frame and respective ones of said cutting members, the pivotal connection of the link members to the frame being disposed in fixed spaced relation with respect to one another; and
(e) means to move said lever arms or links toward and away from said selected plane and thereby effect movement of said cutting members in a direction generally toward and away from one another respectively to sever and receive an article therebetween.

30. A shear as defined in claim 29 wherein said cutting members comprise a pair of substantially flat plate-like members having cutting edges in face-to-face relation.

31. A shear as defined in claim 30 wherein said means to effect movement of said cutting members comprises a hydraulic piston-cylinder assembly interconnecting said pair of lever arms.

32. A shear as defined in claim 29 wherein said frame extends longitudinally with the lever arms supported adjacent respective opposite ends thereof to swing about spaced apart, substantially parallel axes.

33. A shear as defined in claim 32 wherein said cutting members comprise a pair of shear blades having cutting edges in opposed, face-to-face relation.

References Cited

UNITED STATES PATENTS 3,270,787   9/1966   Rehnstrom _____ 144—34

GERALD A. DOST, Primary Examiner

U.S. Cl. X.R.

144—34

UNITED STATES PATENT OFFICE
CERTIFICATE OF CORRECTION

Patent No. 3,527,272                          September 8, 1970

Douglas D. Hamilton

It is certified that error appears in the above identified patent and that said Letters Patent are hereby corrected as shown below:

In the heading to the printed specification, lines 6 and 7, "Anne Paper Ltd." should read -- Abitibi St. Anne Paper Ltd. --.

Signed and sealed this 2nd day of March 1971.

(SEAL)
Attest:

Edward M. Fletcher, Jr.                  WILLIAM E. SCHUYLER, JR.
Attesting Officer                            Commissioner of Patents